UNITED STATES PATENT OFFICE.

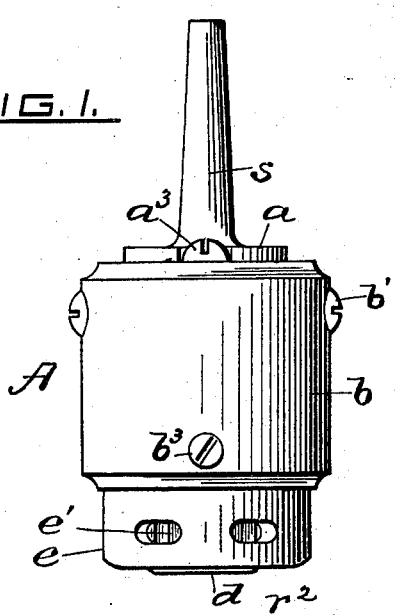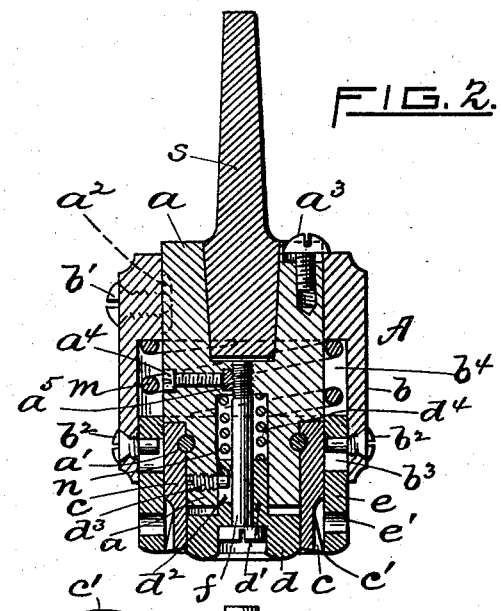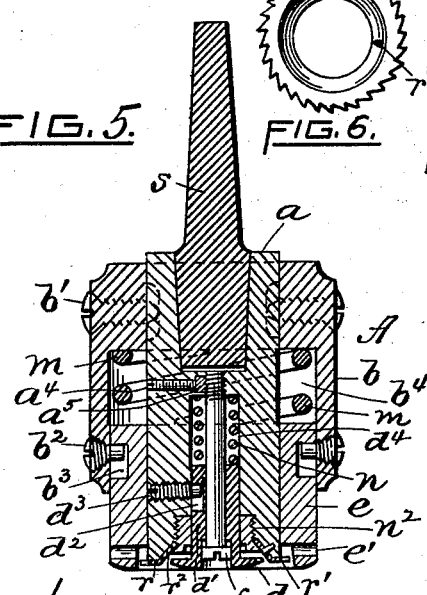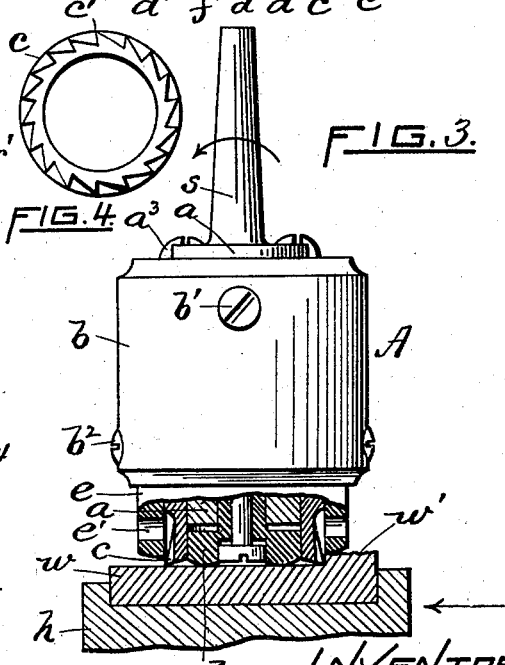

SAMUEL D. KEENE, OF PROVIDENCE, RHODE ISLAND, ASSIGNOR TO LORENZO P. STURTEVANT, OF NORTH SWANSEA, MASSACHUSETTS.

MILLING-TOOL.

SPECIFICATION forming part of Letters Patent No. 683,207, dated September 24, 1901.

Application filed January 22, 1901. Serial No. 44,300. (No model.)

*To all whom it may concern:*

Be it known that I, SAMUEL D. KEENE, a citizen of the United States of America, and a resident of Providence, in the county of Providence and State of Rhode Island, have invented certain new and useful Improvements in Milling-Tools, of which the following is a specification.

My invention relates to improvements in milling-tools—that is, suitably mounted and driven milling devices in which the revolving cutter is adapted to cut away surplus material from the piece of stock or work being operated upon, the latter meanwhile being fed gradually into engagement with the cutters, thereby producing a true surface or one whose form is a counterpart of the contour of the cutter.

It is well known that the surfaces of castings, struck-up or die work—such, for example as the small parts of guns, sewing-machines, articles of jewelry, &c.—are more or less uneven or irregular, and in order to true off or remove the surplus metal from such surfaces the pieces are first mounted in suitable holders or clamping devices. The upper or exposed surfaces are then subjected to the action of suitably-operated cutting-tools—such as planing, milling, grinding, filing, &c.—thereby cutting away the stock and reducing the surfaces, say, to a uniform plane. In some cases it is practically impossible, or at least inconvenient, to secure the work to a holder. In that event, if the form and character of the work permits, the piece or blank is placed loosely upon the holder, the latter having a slight recess therein or otherwise adapted to the shape or contour of the blank in or on which the work rests. It is obvious, of course, that the working relation of the several parts is such that the teeth or cutting-faces of the revolving cutters should not engage the surface of the die or holder supporting the work.

My improved milling-tool consists, essentially, of the cutter proper, preferably annular in form and rigidly secured to a holder adapted to be rotatively driven in any suitable manner, the axis of rotation being at right angles with the plane of the work, a yielding or resilient friction-sleeve driven by and in unison with said holder and surrounding the cutter, and a similarly-driven adjustably-mounted centrally-arranged resilient friction member. In my improved milling-tool the cutter is located between or intermediate of the outer and inner spring-pressed friction members. These latter, while being positively driven or rotated, have an independent endwise movement. The bottom or outer end of each is slightly convex and smooth and is adapted to bear in a yielding manner upon the surface of the work being operated upon by the cutter.

In the accompanying sheet of drawings, Figure 1 is a side elevation of my improved milling-tool. Fig. 2 is a vertical sectional view taken through the center of the device, the several parts being in their normal position or relation. Fig. 3 is a side view, the lower portion being sectionally represented, showing the device as in use. Fig. 4 is an inverted end view of the annular cutter used in the milling-tool. Fig. 5 is a sectional view similar to Fig. 2, showing a modification of the cutting member, &c.; and Fig. 6 is an inverted plan view of the cutter.

A in the drawings designates my improved milling-tool as a whole. The head or body portion $a$ is or may be adapted to snugly receive a suitable stem or spindle $s$, which in turn is chucked to the driving-spindle of the milling-machine substantially as usual. The lower portion of said head member is reduced in diameter and has secured thereto the annular cutter or hardened-steel mill $c$, having suitable cutting-teeth $c'$, arranged longitudinally of the mill, as common. Pins $a'$ serve to rigidly secure the cutter to the head. (See Fig. 2.) Surrounding the member $a$ is an outer casing $b$, the latter being adjustably secured to the head by means of set-screws $b'$, having their inner ends extending into longitudinally-arranged slots $a^2$, formed in said head. The lower portion of the casing is counterbored, thus forming a chamber $b^4$, in which is mounted a stiff helical spring $m$.

$e$ indicates an outer friction-sleeve slidably fitted in the counterbored portion of said casing, the same extending downwardly beyond the latter and surrounding the cutter $c$, while at the same time it is pressed by the spring $m$. Screws $b^2$, passing through the casing and into slots $b^3$, formed in the sleeve, serve not only to secure the members together, but also form stops for limiting the endwise movement of the sleeve, as clearly shown.

$d$ indicates an inner or central friction member slidably and yieldingly mounted in the lower part of the head $a$ in a manner substantially the same as first described with respect to the sleeve $e$. The member $d$ has a stem portion $d'$, reduced in diameter, extending upwardly into a counterbored hole $d^4$, formed in said head, and is resisted by a spring $n$. The member $d$ has a central screw $f$, extending upwardly therethrough and tapped into the head. The tension of spring $n$ may be regulated by means of said screw, the latter being maintained in position after adjustment by means of the small set-screw $a^4$, tapped into the member $a$ and bearing against a piece of metal, as copper, $a^5$, in turn bearing against the thread of the screw. A similar screw $d^3$, tapped into the lower part of the head $a$ and extending into a slotted opening $d^2$, formed in the stem portion of said friction member $d$, insures the axial rotation of the latter when the driving-head is actuated, and also forms a stop for limiting the endwise movement of the part $d$. The relative endwise adjustment of the members $a$ and $b$, thereby also regulating the force or tension of the spring $m$, is effected through the medium of screw $a^3$, tapped into the upper end of the head, as clearly represented. I prefer to adjust the normal relation of the several parts to one another so that the lower end or working face of the outer friction sleeve $e$ will be a little below or at least flush with the corresponding end of the cutter $c$, while that of the inner or central friction member $d$ will extend below the cutter. (See Fig. 2.)

The manner of operation of my improved milling-tool A is substantially as follows: The tool is first "chucked" or secured to the usual revoluble driving-spindle, the construction of the device being such that upon revolving the spindle all the parts of the tool revolve in unison with it. Now assuming that a piece of work $w$, having a rough or irregular upper surface $w'$, is placed in a holder $h$ and fed ahead in the arrow direction, (see Fig. 3,) the revolving tool, after being properly adjusted vertically with respect to the work, operates to cut away the surplus stock from the piece $w$, while at the same time the sleeve $e$ bears yieldingly upon the irregular surface $w'$ and in advance of the cutter, thereby maintaining the work in position while being operated upon by the cutter. The other or central sleeve or member $d$, while capable of yielding vertical movement independently of the sleeve $e$, bears frictionally upon the trued or finished surface of the work, as clearly shown. This friction member also serves to maintain the work in position in the holder $h$. The lower portion of the member $e$ may be provided with a series of peripherally-arranged openings $e'$, through which the "chips" or surplus metal cut from the work is discharged.

In Fig. 5 I have represented a modified form of the cutting-tool. In this case I employ a saw or annular disk-like cutter $r$, adapted to be seated in the lower end of the driving-head $a$, an annular screw $n^2$, tapped into the head, being used to hold the cutter in position. A dowel-pin $r'$ may be used also, if desired. The inner portion of the cutter is beveled, as at $r^2$, the member $a$ being correspondingly beveled, so as to form a seat therefor. In this device I use a spring-pressed outer friction-ring $e$ and a yieldingly-mounted central or inner friction member $d$, substantially as hereinbefore described.

I claim as my invention—

1. In a milling-tool having a suitably-mounted annular cutting member, inner and outer independently-movable spring-pressed friction members having said cutting member located between said friction members, substantially as described and for the purpose set forth.

2. In a revoluble milling-tool, the combination with the head or body portion and an annular cutter secured thereto, of an inner or central spring-pressed endwise-movable friction member, an outer spring-pressed endwise-movable friction member, both being adapted to revolve axially in unison with the cutter, and having the latter located between said friction members, substantially as described and for the purpose set forth.

3. In a revoluble milling-tool, the combination with a driving-head and the cutter member secured thereto, of inner and outer spring-pressed independently-movable friction members having said cutter interposed between them and concentric therewith, the said friction members being adapted to revolve in unison with the driving-head, substantially as hereinbefore set forth.

4. The combination with the driving-head or cutter-holder $a$ and an endwise-movable spring-pressed central friction member $d$ adjustably secured thereto, of a casing $b$ adjustably secured to said head, an endwise-movable spring-pressed friction member $e$ attached to and adapted to revolve in unison with said casing, and an annular cutter removably secured to said driving-head and located between the adjacent peripheral sides or faces of the said friction members, substantially as described.

Signed by me at Providence, Rhode Island, this 18th day of January, A. D. 1901.

SAMUEL D. KEENE.

Witnesses:
 GEO. H. REMINGTON,
 GRACE E. SMITH.